June 10, 1952  S. J. GARTNER ET AL  2,600,052
PIN UNLOADER
Filed Jan. 3, 1946  6 Sheets-Sheet 1
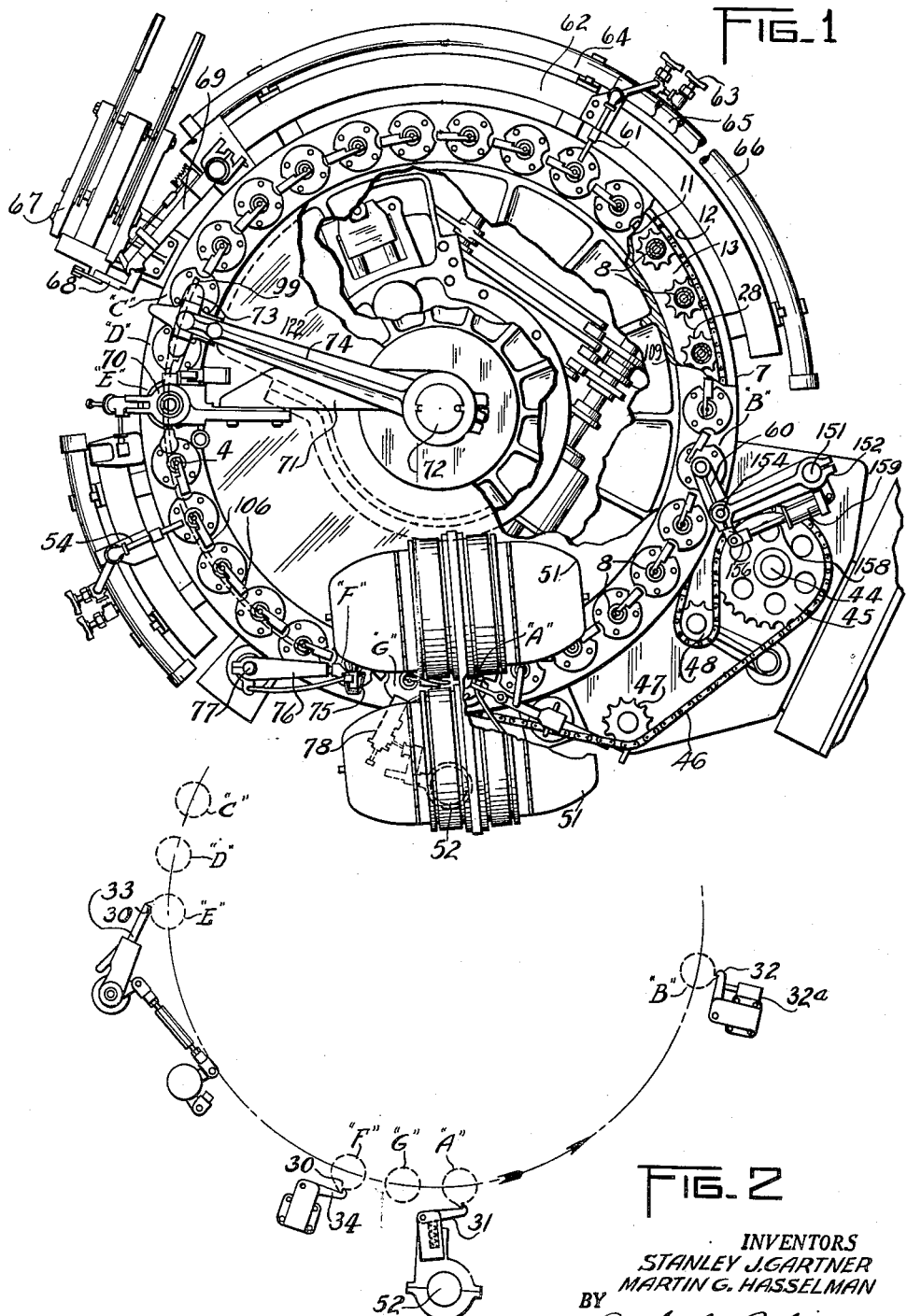
INVENTORS
STANLEY J. GARTNER
MARTIN G. HASSELMAN
BY Arthur L B Richardson
THEIR ATTORNEY

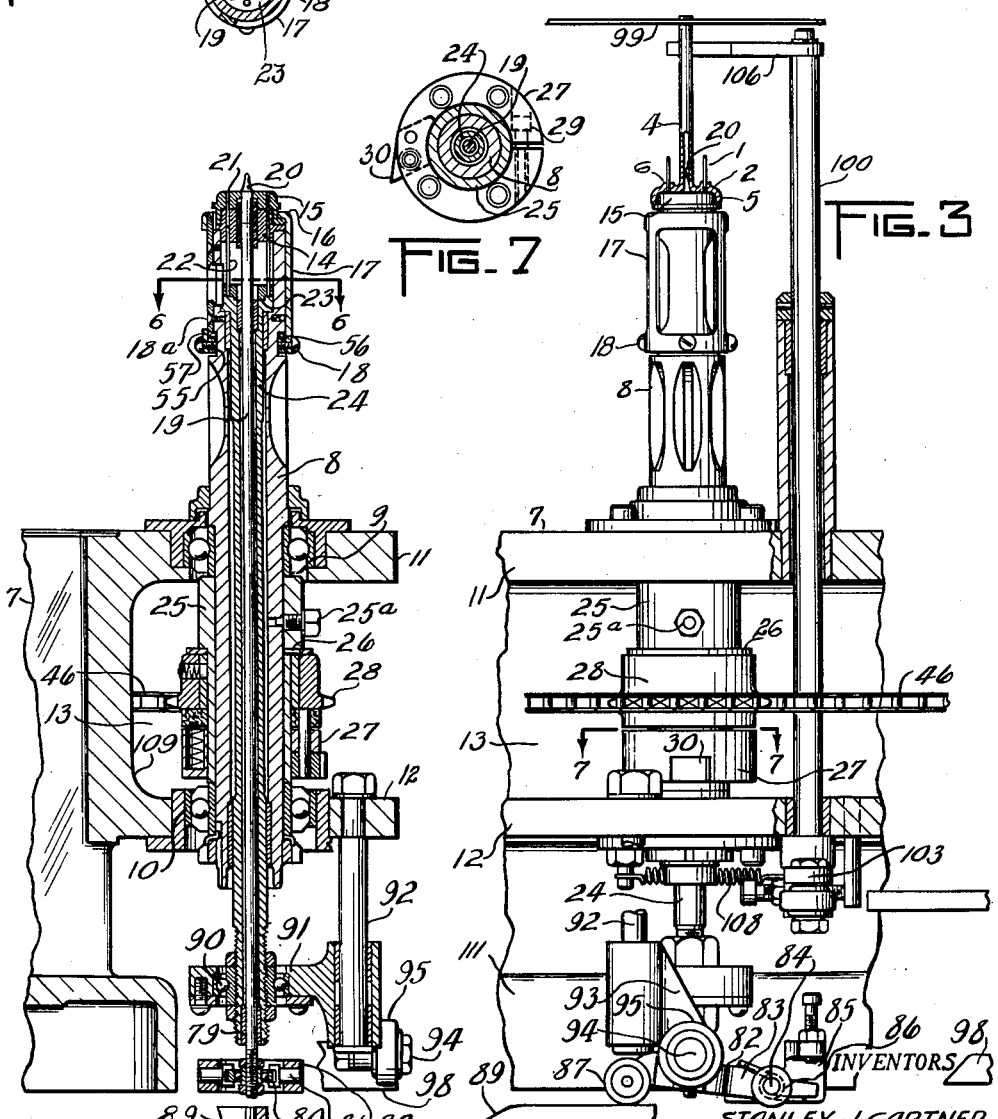

June 10, 1952     S. J. GARTNER ET AL     2,600,052
PIN UNLOADER
Filed Jan. 3, 1946     6 Sheets-Sheet 3
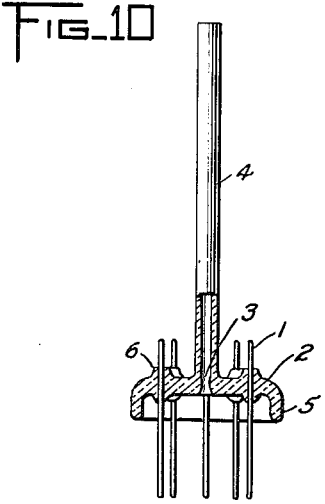
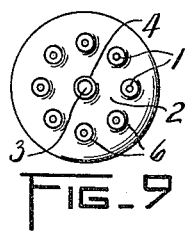
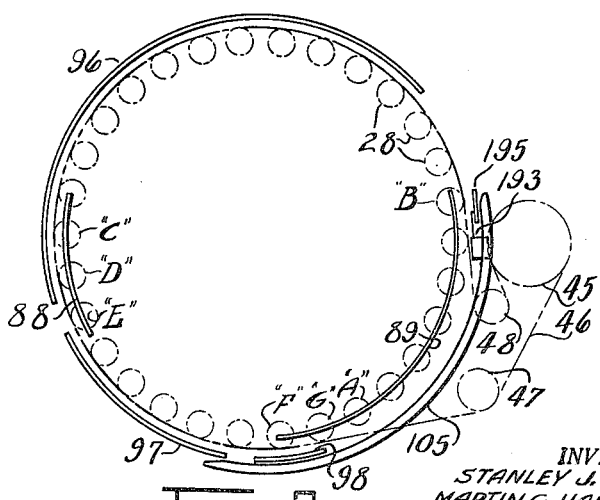
INVENTORS
STANLEY J. GARTNER
MARTIN G. HASSELMAN
BY
THEIR ATTORNEY

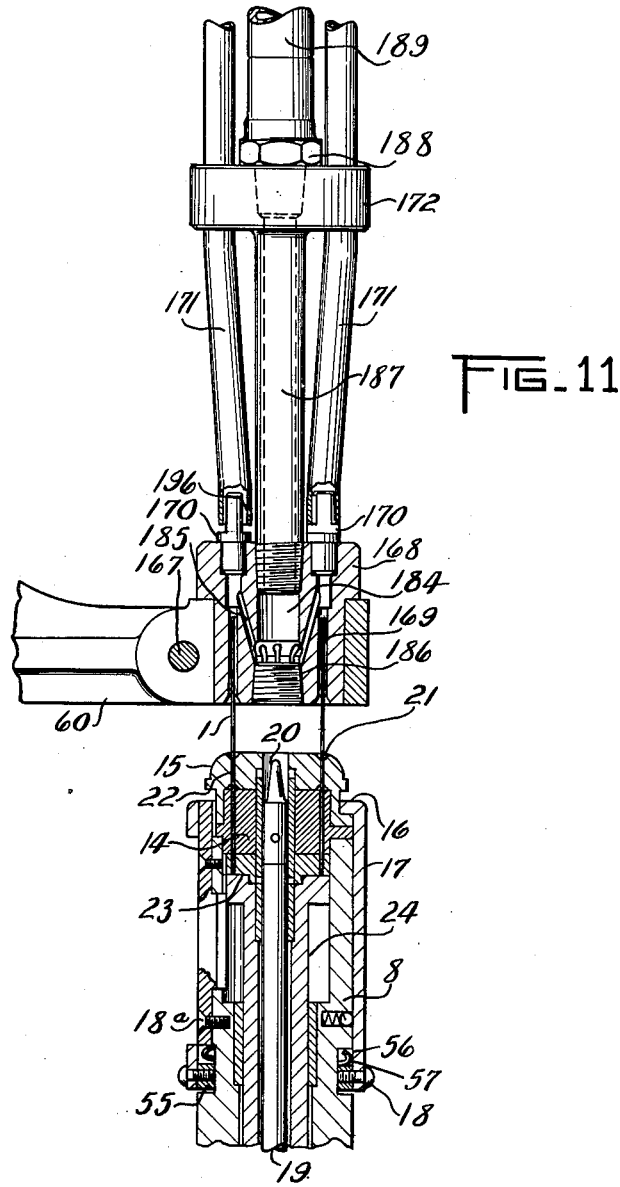

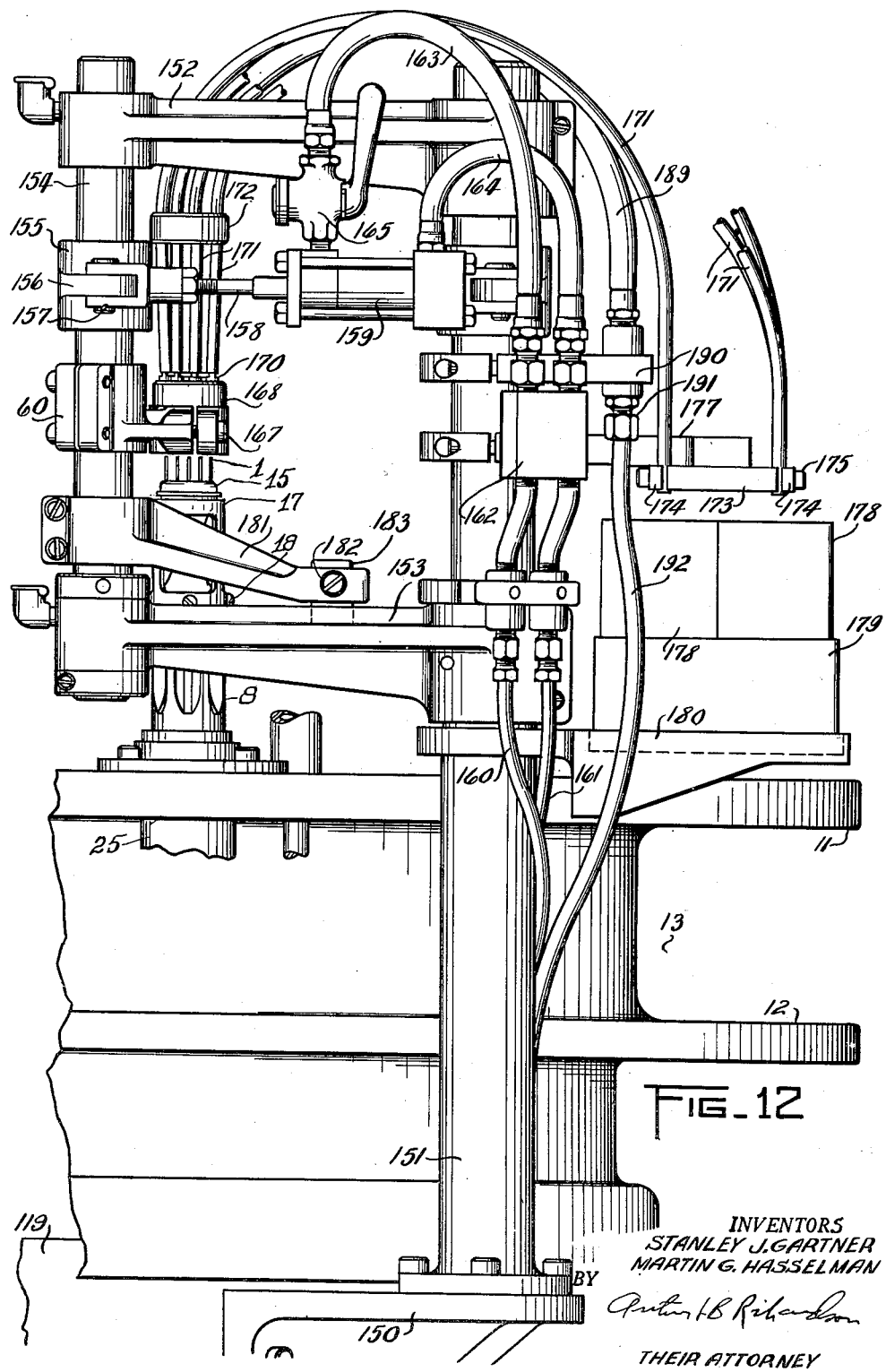
FIG_12

June 10, 1952　　　S. J. GARTNER ET AL　　　2,600,052
PIN UNLOADER
Filed Jan. 3, 1946　　　　　　　　　　　6 Sheets-Sheet 6
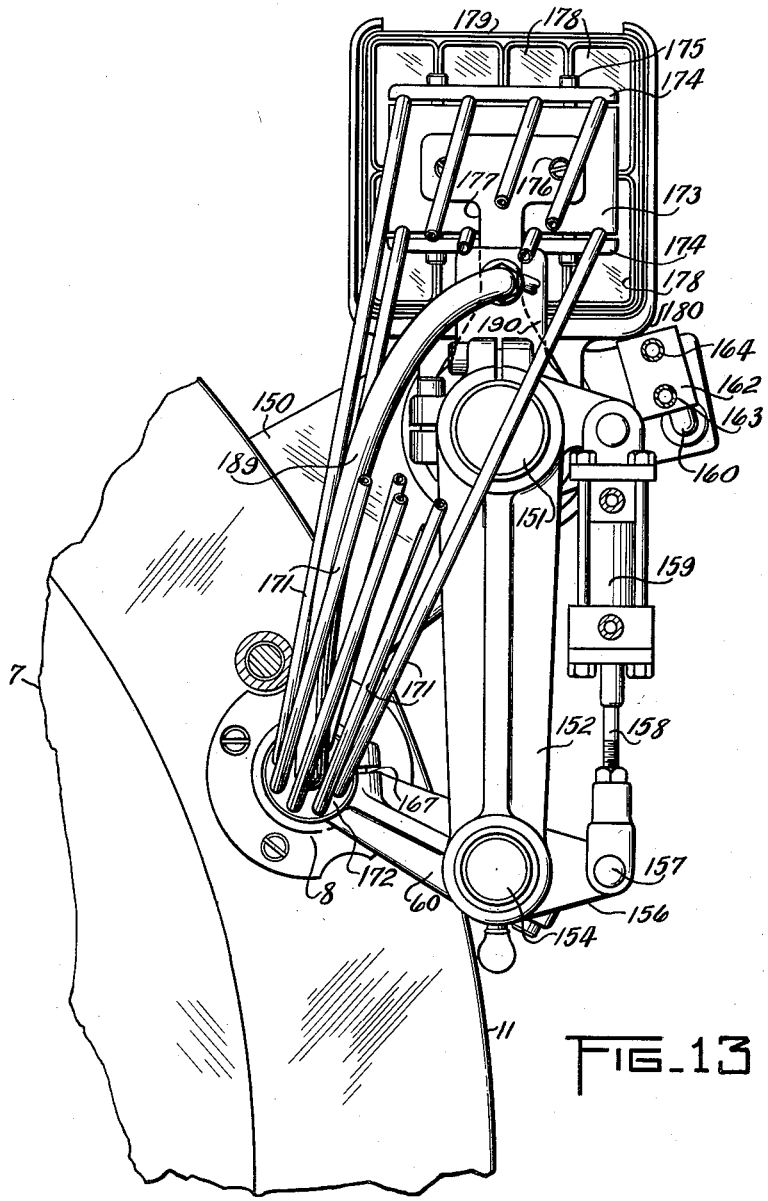
FIG_13
INVENTORS
STANLEY J. GARTNER
MARTIN G. HASSELMAN
BY
Arthur B Richardson
THEIR ATTORNEY Patented June 10, 1952

2,600,052

UNITED STATES PATENT OFFICE 2,600,052

PIN UNLOADER

Stanley J. Gartner and Martin G. Hasselman, Emporium, Pa., assignors to Sylvania Electric Products, Inc., a corporation of Massachusetts Application January 3, 1946, Serial No. 638,861

9 Claims. (Cl. 49—2)

The present invention relates to machines used in the production of glass headers for radio receiving tubes and the like in which a plurality of lead-in wires or terminal pins are sealed in, and an evacuation tube joined thereto.

A machine of the character described includes a work table or carrier in the form of a turret mounted to rotate about a vertical axis and on which is a plurality of vertically extending spindles regularly spaced in a circle concentric with the turret and adjacent its outer periphery. These spindles are independently rotatable about their own axes but have a driving connection common to all of them, while rotation of the turret is by other means which includes indexing mechanism for effecting its regular intermittent angular movement through an arc equal to the angular spacing of the spindles.

During its cycle the turret traverses a plurality of stations at predetermined ones of which different operations are performed and where the spindles are independently locked against rotation, these operations and the mechanism for accomplishing them being, in the present instance, substantially as follows:

It should first be understood that on the upper end of each spindle is a cap piece or lower mold having a central aperture for receiving a rod mounted for reciprocating movement in the spindle, that surrounding the central aperture is a plurality of regularly spaced smaller holes for receiving lengths of wire or terminal pins to be embedded in the header and form an integral part thereof, and that each of these molds independently and successively mates with an upper mold on a reciprocating press member.

At a first station terminal pins are automatically dropped into the small apertures of the lower mold and extend upwardly therefrom.

Then, as the spindles traverse a loading zone, glass wafers having a central opening and smaller openings registering with those in the mold are manually placed on the molds with the pins extending therethrough. At a further station mechanism operates to remove the pins from any mold on which the operator has failed to place a wafer. This is the station where the mechanism of the present invention operates and which will be hereinafter more fully described. Thereafter during the traverse of the spindles the wafers are subjected to flames from high-heat burners for the purpose of fusing the metal terminals to the glass and for softening the glass so that when the spindles successively reach the stem loader the glass is in condition for tubulation, and which involves the joining of a glass tubing to the wafer. Subsequently and at an advanced station the reciprocating press functions to mold the glass wafer so as to provide reinforcement around the terminal pins and give it shape where the tubing is joined thereto.

From the press, which is the final operation, except for the projection of air jets against the glass to cool it, the spindles move to an unloading station where the completely assembled header is automatically lifted from the lower mold and deposited on a discharge chute.

In the event of failure by the operator to place a wafer on a spindle during traverse of the latter through the loading zone, it is desirable to remove the pins from the mold so as to save them for further use. The present invention is directed to an arrangement for performing this operation.

An object of the invention is to remove the pins by suction from a mold piece in which they are supported.

Another object of the invention is to employ mechanical means operating to give an initial upward push to the pins, so as to be certain of their being sufficiently loose in the mold as to make positive the effectiveness of the suction device.

Since the pins may be of various lengths, it is a further object of the invention to segregate the removed pins into respectively designated compartments.

In the illustrated embodiments of the invention there has been provided a swinging head movable into operative position over the spindle and having a plurality of passages axially aligned with respective holes in the mold from which the terminal pins extend. The cooperating mechanical means lifts the pins to be removed such a distance as to enter their upper ends into the open passages therefor in the swinging head, whereupon they are caught by suction and their removal from the mold completed. Individual tubes are provided leading from respective ones of the passages in the head and through which the pins are carried by air streams to the discharge compartments.

A further object of the invention is the provision of a pin unloader constructed and operating in such a manner that, while the pins are given an initial start by mechanical means and their removal from the mold completed by suction, they are caught by and carried on through the conductor tubes by an upward surge of air under pressure which also is the force for creating the suction.

A still further object of the invention is the provision of a pin unloader which is of simple construction, positive in operation, not liable to derangement and one that not only effects a saving in material but of labor as well.

To these and other ends the invention consists of certain parts and combinations of parts as will be fully set forth in the following description and particularly defined in the appended claims.

The accompanying drawings illustrate, as hereinabove stated, the invention as embodied in a machine used in the manufacture of radio receiving tubes for the assembly and sealing of an evacuation tube and terminal pins in the press member or header of a tube. The turret indexing means and particular spindle drive shown, are described in more detail in the copending application of Stanley J. Gartner and Paul G. Pilkinton, Serial No. 635,889 filed December 19, 1945, to which reference may be had for the details of construction and operation. In this application only such reference to this structure will be made as required for understanding of present invention.

Fig. 1 is a top plan view of the machine with parts broken away to show details of construction, and showing only such portions of the superstructure and parts surrounding the turret as may be necessary to illustrate in a general way the functions performed at successive stations to which the turret is indexed during its cycle.

Fig. 2 is a diagrammatic plan view indicating the stations at which the work-holding spindles are locked against independent rotation and certain other stations to which special reference will be made.

Fig. 3 is a fragmentary view of the turret in side elevation and showing one of the work-holding spindles and associated parts.

Fig. 4 is a detail in side view of actuating mechanism to be explained.

Fig. 5 is a longitudinal sectional view taken vertically through the spindle.

Fig. 6 is a transverse sectional detail on line 6—6 of Fig. 5.

Fig. 7 is a transverse sectional detail on line 7—7 of Fig. 3.

Fig. 8 is a diagrammatic illustration in plan view of the chain drive for the spindles and showing, also, the arrangement of certain cam tracks the purpose of which will hereinafter be described.

Fig. 9 is a top plan view of the completed work piece.

Fig. 10 shows the work piece partly in elevation and partly in vertical central section.

Fig. 11 is a fragmentary view drawn to full scale and showing partly in side elevation and partly in vertical central section the upper portion of a spindle and the lower part of the pin unloader in its operative position.

Fig. 12 is a view in elevation of the pin unloader and showing, also, the adjacent part of the turret and one of the spindles.

Fig. 13 is a top plan view of the parts illustrated in Fig. 12.

In the drawings similar reference numerals refer to similar parts throughout the several views.

The work to be accomplished by the machine is, referring first to Figs. 9 and 10, the assembly and hermetical sealing of a plurality of terminal pins 1 in an inverted cupshaped glass header which in use forms an end closure for an electronic tube of the type used in radio receiving sets and, further, by fusing of the glass to attach integrally therewith a hollow glass stem upstanding from the header and through which the tube is evacuated, the stem later being sealed close to its inner end and the extra length cut off.

The header referred to is shown as a glass wafer or disc 2 having a central aperture 3 opening into the stem which comprises an elongated tubing 4. In a circle concentric with the opening 3 is a plurality of apertures for receiving the pins 1 while the peripheral edge of the disc is turned down to provide a depending, reinforcing flange 5 which later is joined with a cylindrical glass envelope to form the bottom portion thereof. Protuberances 6 surrounding the pins and formed during a pressing operation give additional support for the pins 1.

Regularly spaced angularly in a circle concentric with and adjacent the outer peripheral edge of a rotatable carrier which, in this instance, is a turret 7, is a plurality of spindles indicated generally by the numeral 8. These spindles, referring more particularly to Figs. 3, 5 to 7, and 11, are each mounted to rotate independently about a vertical axis on radial ball bearings 9 and 10 located in spaced horizontally extending top and bottom annular flanges 11 and 12, respectively, extending outwardly from the side wall of the turret 7 to form an outwardly opening channel 13.

Each spindle 8 is a tubular shaft and included in parts carried thereby and others associated therewith, as will hereinafter be described, is a closure member 14 inserted in its upper end and upon which is seated a cap or what will be hereinafter termed the lower mold 15 of a pair of press members, this mold being removably clamped in place by the interlocking engagement therewith of inturned segmental flange portions 16 of a sleeve 17 surrounding the shaft 8. Secured to the lower end of the sleeve 17 by screws 18 is an inner ring 55 seated in an annular recess 56 in the spindle shaft and whereby the sleeve is held against removal, a short coiled spring 57 being interposed between the ring and the top wall of the recess. Rotary displacement of the sleeve is prevented by a screw 18ª extending therethrough into the spindle shaft.

An opening exteds through the end closure 14 and the mold 15 for slidably receiving an axially movable rod 19, the reduced and tapered tip end 20 of which functions to maintain an opening at the juncture of the stem 4 and disc 2 when the glass is in molten condition and, further, to act with the upper press member in molding the parts at this point. In a circle concentric with the rod 19 and parallel therewith is a plurality of regularly spaced apertures 21 extending through both members 14 and 15 for receiving the terminal pins 1 and which register with the openings for such pins in the work piece 2.

Extending part way into the apertures 21 from their lower ends are slender rods 22 functioning both as stops and knockouts for the pins 1, these rods being secured at their lower ends in a collar 23 spaced below the end closure 14 and carried on the upper end of an axially movable sleeve 24 interposed between the center rod 19 and the wall of the spindle shaft 8. This sliding pin feature of the spindle construction will be hereinafter more fully described.

Fixed to the spindle shaft 8 by set screw 25ª is an outer sleeve 25 comprising a spacer between the inner race members of bearings 9 and 10. This sleeve has a reduced portion to provide a shoulder 26 and interposed between the shoulder and an axially operable friction clutch 27 is a sprocket wheel 28. The clutch rotates with the spindle by being clamped to the outer sleeve 25 by screw 29, Fig. 7, and carries a fixed radially extending pawl 30 which, when engaged by one or another of the latches 31, 32, 33, or 34 at different operating stations, see Fig. 2, and as will be explained, effects a locking of the spindle against rotation while permitting free rotation of its respective sprocket wheel, the latter being driven by a chain 46 wrapped around the turret 7 in a channel 13 between flanges 11 and 12 (Figure 3).

A drive shaft 44 driven by suitable motor means carries driving sprocket wheel 45 which engages chain 46. This chain 46 lies in a horizontal plane and for the greater part of its length travels in the channel 13 formed between the turret flanges 11 and 12. It is in driving connection with all but a few of the spindle sprockets 28, the number of disengaged sprockets being determined by the location of an idle sprocket 47 and another idler 48 with both of which the chain is in mesh as shown in Figure 8.

Fig. 1 shows a plurality of hoppers 51 for separately containing a supply of terminal pins which may be of different lengths. These hoppers are supported upon a standard indicated at 52. A feed tube, not shown, for the pins 1 leads from each hopper and when a spindle 8 is at station A and locked against rotation, with the apertures 21 (Figure 5) in registry with the feed tubes, by engagement of its detent 30 (Figure 7) with spring actuated latch 31, mechanism is actuated, for feeding a pin 1 into each of the apertures 21 in the mold 15.

From station A (Figure 2) the particular spindle to which reference is being made is advanced counterclockwise by a succession of intermittent movements to station B. At several of the intervening stops between stations A and B the spindles 8, while not held against axial rotation, are not being positively driven due to their sprockets 28 being out of mesh with the chain 46. This is the leading zone where the operator, by means of a pair of tongs, picks up a preheated glass disc 2 from the discharge end of a chute or other source of work supply and places it on the mold 15 and over the pins 1 which are upstanding from the mold.

Station B is the pin unloading station in the cycle and as the spindle 8 carries at that station it is there held against rotation by latch 32 which is normally in operative position to engage stop finger 30 carried by the spindle.

From station B to station C the spindles are intermittently advanced and while they are traversing this portion of the cycle, and independently rotating about their axes, the work thereon is heated by flames directed at it from burners, one of which is indicated at 61 (Figure 1), these burners being supported by a segmental frame member 62 partly surrounding the turret and having control valves 63 whereby a proper admixture of gas, air and oxygen is furnished through the supply pipes 64, 65, and 66.

At station C, where rotation of the spindle is not stopped, a stem 4 is placed endwise on the wafer 2 of which by fusing it readily becomes an integral part, the stem being received from a supply hopper 67 by a carrier 68 which turns it to an upright position whence it is grasped by a spring retractable pivoted arm 69 and swung to alignment with the axis of the spindle.

The second intermittent stop beyond station C is at station E where the spindle is locked against rotation by latch 33, in this instance cam actuated, and a press, indicated generally by numeral 70, Fig. 1, is carried by a fixed arm 71 extending radially from the center post 72 of the machine. This press includes an upper mold, not shown, which mates with the lower mold 15 to press the softened glass of wafer or header 2, thus molding the glass to form the protuberances 6 and effecting a sealing of glass to metal around the pins 1 and, in cooperation with the tapered end 20 of the rod 19, to shape the glass at the juncture of the stem 4 with the wafer. At the same time, acting in cooperation with following spindles, a prepress member indicated generally at 73, Fig. 1, and carried by a fixed radial arm 74 has pressure pads or heads acting against the ends of stems 4 at station C and at the intermediate stop D between stations C and E.

This press and prepress device form subject matter of a copending application Serial No. 634,420, filed December 12, 1945.

From station E the work is intermittently advanced to station F where the spindle 8 is locked against rotation by spring pressed latch 34, and gripping fingers 75 clamp the stem 4 of the finished work-piece, lift the work off the mold 15 and, by means of a swinging arm 76 pivoted at 77 deposit it on a discharge chute, not shown. During the traverse of the spindle from the press to the unloading station the work may, for more rapid cooling, be subjected to the impingement of air from one or more jets 54. At the next stop, indicated at G and being the one intermediate the unloading station F and the starting or pin escapement or feeding station A, an atomizer 78, Fig. 1, is employed to spray the mold 15 with a solution which prevents adherence of glass to the mold.

Inasmuch as the different devices just above referred to as functioning in cooperation with the spindles 8 at specified stations, with the exception of the pin unloader, are not included in the present invention, it is believed that neither a more detailed showing or description thereof is called for.

*Spindle operation*

Again referring to the spindle construction particularly as shown in Figures 3 and 5 and to the fact that the telescoping center rod 19 and inner sleeve 24 are axially movable independently of each other, it will be observed also that the rod extends below the sleeve and is guided adjacent its lower end in the bushing 79 inserted in the bottom of the sleeve. This lower end of rod 19 is threaded for axial adjustment into the inner race member of a radial ball bearing 80, the outer race of which carries trunnions 81 rotatably mounted in a ring portion 82 formed on the long arm of a lever 83 pivoted intermediate its ends at 84 to a bracket 85 carried by the turret and acting against a torsional spring 86. This lever 83, through action of the spring 86, acts to exert a downward pull on rod 19 so that its tip end 20 is normally below the top of the mold 15, at a position predetermined by axial adjustment of the rod. In the path of a roller 87 on the long arm of the lever 83 are spaced segmental cam tracks 88 and 89 which, when the roller rides thereon, rock the lever 83 against action of spring 86 to raise the rod 19 so that its tip end 20 extends above the mold 15, as indicated in Figs. 5 and 7, the rod being in this raised position during the stem loading and pressing operations so as to center the stem and maintain an opening therethrough and through the wafer 2 during the joining of these parts. The rod then drops and is again raised while its spindle is traversing the loading zone between stations A and B.

Likewise the lower end of sleeve 24 is threaded for axial adjustment of the sleeve through the inner race member of a radial ball bearing 90 the outer race of which is pressed into an arm 91 slidably supported on a rod 92 depending from the turret flange 12, the arm 91 being formed with a bracket portion 93 carrying a horizontally arranged stud 94 on which a roller 95 is mounted as illustrated in Figs. 3, 4 and 5.

In the path of the roller 95 is a cam track concentric with the turret and comprising segmental portions 96, 97, and 98 (Figure 8). At the pin loading station A roller 95 is not in engagement with a cam surface thus permitting the sleeve 24 to drop by gravity to its lowermost position, as seen in Fig. 5. When, however, at a predetermined point in the cycle of the turret the roller 95 engages cam segment 96, the sleeve 24 is raised, carrying with it the collar 23 and rods 22, the upper ends of the latter forming predetermined levels for the bottoms of the pins 1 or, in other words, determining the length of such pins below the header 2. A break in the cam track at station E permits these stop pins to drop while the press in is operation. Cam 97 raises the header being molded away from the molds to assist in cooling it between stations E and F. A greater rise is provided in the cam track along segment 98 whereby the rods 22 function to assist in knocking out the pins from the mold 15 at the unloading station F and as cleanouts for the apertures 21 when the mold is being sprayed at station G. These last named functions of the rods 22 will hereinafter be more fully described.

For the purpose of supporting the stems 4 coaxially with the spindles during traverse of the turret from stem loading station C to the unloading station F a fixed segmental guide bar 99 is arranged between such stations and in a horizontal plane slightly below the upper ends of the stems. This bar, a fragmentary portion of which is shown in Fig. 3, is indicated in phantom in Fig. 1 by broken lines in order to be less confusing. Cooperating with the curved bar 99 is a plurality of stem engaging members 106 carried by vertical shaft 100 which hold stem 4 in an upright position.

A spring 108 anchored at one end to the inner arm of lever 103 and at its other end to a fixed part normally holds the stem engaging arm 106 in operative position.

Pin unloader

Referring now to Figs. 1, 2, 4, 11, 12 and 13.

Supported upon a bracket 150 carried by the table 119 is an upstanding fixed post 151 to which is clamped a pair of spaced, horizontally disposed brackets 152 and 153 in the outer ends of which a shaft 154 is mounted to turn about a vertical axis. Rotary movement of this shaft is effected, first in one direction and then in the other, by a collar 155 clamped thereto and formed with an arm 156 which is oscillated by having pivotal connection at 157 with the piston rod 158 of a reciprocatory air motor or two-way air cylinder 159. Air lines 163 and 164 are each associated with one end of the air motor or air cylinder 159. Air line 163 is connected through connection block 162 to a further air line 160 while air line 164 is similarly connected to a further air line 161. By applying air pressure from a source (not shown) to one line or another of air lines 163 and 164, the piston within cylinder 159 may be moved and the swinging arm 60 may be selectively moved into and out of position over mold 15 as required. A control valve 165 may be inserted in air line 163 whereby the speed of travel of the piston associated with the piston rod 158 may be reduced as desired.

Clamped to shaft 154 below the collar 155 is one end of the horizontally disposed lever 60 in the outer end of which there is clamped, by screw 167 in a manner to permit rotary adjustment, a head 168 having a plurality of vertically extending passages 169 which, when the head is swung into operative position above the mold 15 on the spindle 8, register with the openings 21 in the spindle member 14 and the terminal pins 1 upstanding from the mold as shown in Figure 11. Preferably, the passages are bell-mouthed at their lower ends and are of greater diameter at their upper ends for reception into the head 168 of tubular connectors 170 to each of which is attached the lower end of a pin discharge tubing 171.

The tubes 171, there being one for each passage 169, are nested adjacent their pin receiving ends within a collar 172 and formed beyond such collar with return bends so that their discharge ends open downwardly. These discharge ends of the tubing are clamped in regularly spaced relation to opposite side edges of a plate 173 by bars 174 supported on clamping screws 175. The plate is fastened by screws 176 to an arm 177 clamped to the post 151 and the tubes 171 are directed so as to discharge into separate receptacles 178, one for each tube, these receptacles being illustrated as rectangular boxes removably fitted within an outer container 179 which in turn is removably supported upon a bracket 180 also secured to the post 151.

As a means for limiting movement of lever 60 to bring the head 168 into precise operative position above the mold 15, a second lever 181 is clamped to the shaft 154 and carries in its outer end an adjusting screw 182 the free end of which engages a fixed stop 183 on the bracket 153.

The head 168 also has an opening 184 extending axially therethrough and from which angularly disposed ducts 185 communicate with the enlarged portions of the passages 169. The lower end of the opening 184 is closed by a screw plug 186 while threaded into its upper end is an air inlet pipe 187 extending downwardly from the collar 172 and surrounded by the nested ends of the tubing 171. The upper end of pipe 187 has coupling at 188 with a tube 189 which like the tubing 171 is formed with a return bend leading from an anchoring bracket 190 on the post 151 and coupled at 191 with an air line 192 which is supplied by air under pressure when the pin removing operation is to take place.

Operation of the pin extracting mechanism or unloader is as follows:

The solenoid 32ª is so conditioned as to cause latch 32 to effect a locking of the spindle 8 at station B.

Air is admitted through pipe 197 to the outer end of a two-way air cylinder 193 shown in the detail Fig. 4 and, diagrammatically, in Fig. 8. Forward movement of the piston rod 194 of this cylinder actuates a bellcrank lever 195 to one arm of which it is pivoted so that the other arm engages the roller 95 to raise the spindle sleeve 24, this roller lifting arm lying in the same circle as cam tracks 96, 97 and 98 and performing a like function but at the one station only.

By reference to Fig. 11 it will be seen that upward movement of sleeve 24 carries with it the slender rods 22 which, guided in the openings 21 in the cap member 14 and mold 25, force the terminal pins 1 upwardly into the lower ends of the aligned passages 169 in the head 168 and break any adherence the pins might have to the walls of the openings 21.

With the pins 1 loosened and partly removed by mechanical means under electrical control, air under pressure admitted into line 192 is conducted through tube 189 and pipe 187 to chamber opening 184 whence it escapes through the ducts 185 into the enlarged upper ends of the passages 169, and then upwardly through the connectors 170 and the several tubes 171. Thus a powerful suction is created in the passages 169 which completes the extraction of the pins 1, drawing them upward through the connectors 170 and into the air streams which carry the pins on through the tubes 171 from which they are dropped into the receptacles 178.

We have, in certain instances, found it advantageous to provide additional air passages, such as indicated at 196 along the connectors 170 attached to the tubing 171 so that additional air will be drawn through openings thus formed. This acts to break up any eddy currents that might form at the upper ends of the connectors 170 and insures the pins being sucked up into the air stream in tubes 171.

The bends in tubes 171 and the conductor 189 are of such extent and the tubes of a flexibility that will permit their being swung the short distance required by movement of the arm 60 without strain being evidenced at their respective anchorages 173 and 190. And, while there is shown one means of supporting and bringing the head 168 into operative position above a spindle, it will be understood that, without departing from the scope of the invention, other means may be employed.

Although we have shown and described particular embodiments of our invention, we do not desire to be limited to the embodiments described, and we intend in the appended claims to cover all modifications which do not depart from the spirit and scope of our invention.

What we claim is:

1. The combination, with a rotatable turret, a number of spindles spaced regularly around the rim of said turret, each spindle having a tubular support member, a closure in the upper end of said support member having a plurality of bores therethrough parallel to the axis of the support member, a sliding member guided for reciprocating movement in said support member, rods carried by said sliding member registering with and extending partway into said bores when the said sliding member is in its lowermost position, a mold carried upon said end closure, said mold having openings registering with the said bores and in which terminal pins are dropped to seat on said rods and project above said mold, and means, at a number of spaced positions around the path of rotation of said turret, for raising said sliding member whereby said rods become knockouts for said terminal pins and cleanouts for the holes in said mold and a suction arrangement at one of said positions adapted to remove said terminal pins from said mold.

2. The combination, with a carrier and means for effecting a regular intermittent movement of said carrier, of a rotatable tubular support upstanding from said carrier, means for rotating said support, a closure in the upper end of said support having a plurality of bores therethrough parallel to the axis of the support, a sliding member guided for reciprocating movement in said support, rods carried by said sliding member registering with and extending partway into said bores when the sliding member is in its lowermost position, a mold on said end closure formed to receive a glass work-piece and rotatable with said support, said mold having openings registering with said bores and in which terminal pins are dropped to seat on said rods and project above said mold, means at a predetermined station in the traverse of said carriage for locking said tubular support against rotation at said station, a head at said station movable into axially spaced relation with said mold, means for effecting movement of said head into and out of operative position, said head having pin receiving passages in registry with the said bores in said closure, pin discharge tubes leading from said head and in communication each with a respective one of said passages, means for raising said sliding member whereby said rods act to lift said pins sufficiently to enter their upper ends into the lower ends of said passages, and connections for directing a stream of air under pressure upwardly into said passages at points above the ends of said pins to create suction in said passages, thereby drawing said pins into the air streams by which said pins are carried through and discharged from said tubes.

3. In combination, a turret mounted to index in a number of steps about a vertical axis, a plurality of vertically extending tubular spindles carried by said turret and regularly spaced in a circle concentric therewith, means for independently rotating said spindles about their own axes, each of said spindles including a closure member at its upper end, a mold clamped to said closure for receiving a glass disc, said disc, mold and closure member having a plurality of respectively aligned openings extending through the said three parts parallel to the axis of said spindle, a sleeve axially movable within the spindle and rotatable therewith, a collar carried by said sleeve and movable with said sleeve, rods anchored in said collar and extending, when said collar is in its lowermost position, part way into the said openings in said closure, said rods providing stops for terminal pins dropped into said openings and which project through the openings in a glass disc on said mold, means at a predetermined station in the circle of said turret operating to lock the spindle at said station against rotation, a head at said station movable into axially spaced relation with said mold, means for moving said head into and out of operative position in axial relationship with said mold, said head having pin receiving passages to register with the said pin openings in the said spindle members when said head is aligned with said spindle, pin discharge tubes leading from said head and in communication each with a respective one of said passages, means at said station for raising the sleeve in the spindle at said station whereby said rods lift said pins sufficiently to enter their upper ends into the lower ends of said head passages, and means for supplying a stream of air under pressure and directed upwardly into said passages at points above the ends of said pins to create suction in said passages, thereby drawing said pins into the air streams by which said pins are carried through and discharged from said tubes.

4. The combination, with a member having a plurality of parallel openings for receiving terminal pins and a movable member upon which said pins are supported to project above and below said member, of means for removing said pins comprising a head having a plurality of parallel passages, a chamber in said head and a duct from said chamber to each of said passages at points intermediate the ends thereof, means for supporting said head above said pin receiving member with said passages aligned with respective ones of said openings in the pin receiving member, said head support and said pin receiving member being relatively movable to bring them into and out of operative position with respect to each other, a pin discharge tube leading from each of said passages at its end remote from said pin receiving member, means operating said pin supporting member to enter said pins into the lower ends of said head passages, an air line connected to said chamber, and means for supplying air under pressure to said line, said ducts entering said passages at an angle such that a stream of air directed into each of said passages from said chamber causes a vacuum in said passages whereby said pins are drawn into said air streams and discharged therewith from said tubes.

5. The combination with a fixed member having a plurality of parallel openings for receiving terminal pins and a movable member upon which said pins are supported to project above and below said fixed member, of means for removing said pins comprising a head having a plurality of parallel passages flared at one end, a chamber and a duct from said chamber to each of said passages at a point intermediate the ends thereof, tubular connectors at the other ends of said passages, means for supporting said head above said fixed member with said passages aligned with respective ones of said openings in said fixed member, said head support being movable to bring said head into and out of operative position with respect to said fixed member, a pin discharge tube leading from each of said connectors and formed with a return bend, means operating said pin supporting member to lift the upper ends of said pins into the flared ends of said head passages, an air line connected to said chamber, and means for supplying air under pressure to said line, said ducts entering said passages at an angle such that a stream of air directed into each of said passages from said chamber causes a vacuum in said passages whereby said pins are drawn into said air streams and discharged therewith from said tubes.

6. A combination in accordance with claim 5 characterized by said connectors including additional air passages to provide inlets to said tubes for air from surrounding atmosphere.

7. An arrangement for extracting a plurality of terminal pins substantially simultaneously from a mold of a spindle, said mold having a number of pin receiving apertures through which said pins are slideable, said pins projecting above and below said mold parallel to the axis of said spindle which includes a head member adapted to be moved into axial alignment with said mold and having a number of longitudinal passages therein which align with said terminal pin apertures when said head is aligned with said mold, a number of pressure rods beneath said mold against which said pins rest, means for moving said rods longitudinally of the axis of said spindle whereby said pins are caused to enter said passages, and means for directing a stream of air under pressure into said passages at points intermediate their ends and at such an angle that suction is created in said passages to draw said pins from said mold and into said air stream.

8. A mechanism for withdrawing a pin from a mold, which mechanism includes in combination a fixture adapted to receive said pin, a movable stop supporting said pin in said mold, said fixture having air passages therein directed to effect a stream of air along said pin and in a direction to remove said pin from said mold and means for moving said stop to introduce said pin into said fixture.

9. A mechanism for withdrawing a pin from a mold, a movable stop supporting said pin in said mold, said mechanism including in combination a fixture having a passage adapted to receive said pin, said fixture having air ducts therein directed to effect a stream of air along said pin and in a direction to remove said pin from said mold and means for moving said stop to introduce said pin into said passage.

STANLEY J. GARTNER.
MARTIN G. HASSELMAN.

REFERENCES CITED

The following references are of record in the file of this patent:

UNITED STATES PATENTS

| Number | Name | Date |
|---|---|---|
| 1,230,563 | Clairborne | June 19, 1917 |
| 2,304,572 | Keall | Dec. 8, 1942 |
| 2,312,003 | Schneider et al. | Feb. 23, 1943 |
| 2,321,224 | Madden et al. | June 8, 1943 |